US011470005B2

(12) United States Patent
Mermoud et al.

(10) Patent No.: US 11,470,005 B2
(45) Date of Patent: Oct. 11, 2022

(54) CONGESTION DETECTION USING MACHINE LEARNING ON ARBITRARY END-TO-END PATHS

(71) Applicant: Cisco Technology, Inc., San Jose, CA (US)

(72) Inventors: Grégory Mermoud, Venthône (CH); Jean-Philippe Vasseur, Saint Martin d'Uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 17/122,755

(22) Filed: Dec. 15, 2020

(65) Prior Publication Data
US 2022/0191142 A1    Jun. 16, 2022

(51) Int. Cl.
*H04L 47/127* (2022.01)
*H04L 47/70* (2022.01)
*G06N 20/00* (2019.01)
*H04L 45/42* (2022.01)
*G06K 9/62* (2022.01)
(Continued)

(52) U.S. Cl.
CPC .......... *H04L 47/127* (2013.01); *G06K 9/6256* (2013.01); *G06N 20/00* (2019.01); *H04L 45/24* (2013.01); *H04L 45/42* (2013.01); *H04L 47/825* (2013.01); *H04W 8/04* (2013.01)

(58) Field of Classification Search
CPC ....... H04L 47/127; H04L 45/24; H04L 45/42; H04L 47/825; G06N 20/00; H04W 8/04
See application file for complete search history.

(56) References Cited

U.S. PATENT DOCUMENTS 10,003,473 B2    6/2018   Vasseur et al.
10,135,735 B2   11/2018   Yousaf et al.
10,178,043 B1 *  1/2019   Ganjam ............... H04L 65/764
(Continued)

FOREIGN PATENT DOCUMENTS

CN       105282484 A  *  1/2016
KR       100548324 B1 *  2/2003
KR      20070042984 A  *  1/2007

OTHER PUBLICATIONS

T. Mangla, E. Halepovic, M. Ammar and E. Zegura, "eMIMIC: Estimating HTTP-Based Video QoE Metrics from Encrypted Network Traffic," 2018 Network Traffic Measurement and Analysis Conference (TMA), 2018, pp. 1-8 (Year: 2018).*

*Primary Examiner* — Jonathan A Bui
(74) *Attorney, Agent, or Firm* — Behmke Innovation Group LLC; Kenneth J. Heywood; Jonathon P. Western (57) ABSTRACT

In one embodiment, a device predicts a range of bitrates expected to be required by one or more applications associated with traffic conveyed via a particular path in a network. The device obtains telemetry data indicative of observed bitrates associated with the traffic conveyed via the particular path in the network. The device identifies, a presence of congestion along the particular path in the network, by comparing the observed bitrates to the range of bitrates expected to be required by the one or more applications. The device causes at least a portion of the traffic to be re-routed from the particular path to a second path in the network, when the device identifies the presence of congestion along the particular path.

20 Claims, 8 Drawing Sheets

(51) Int. Cl.
*H04L 45/24* (2022.01)
*H04W 8/04* (2009.01)

(56) References Cited

U.S. PATENT DOCUMENTS

| | | | |
|---|---|---|---|
| 10,193,811 | B1 | 1/2019 | Satyanarayana et al. |
| 10,673,740 | B2 | 6/2020 | Rafique et al. |
| 2003/0185205 | A1* | 10/2003 | Beshai ............... H04L 41/0816 370/351 |
| 2005/0013244 | A1* | 1/2005 | Parlos .................... H04L 47/32 370/229 |
| 2010/0177633 | A1* | 7/2010 | Bader ................... H04L 47/822 370/230 |
| 2010/0195521 | A1* | 8/2010 | Wanstedt ............... H04L 47/29 370/252 |
| 2015/0249622 | A1* | 9/2015 | Phillips ................ H04L 65/612 709/219 |
| 2016/0134673 | A1* | 5/2016 | MacInnis ............... H04L 65/80 709/231 |
| 2019/0068474 | A1 | 2/2019 | Vasseur et al. |
| 2020/0162371 | A1 | 5/2020 | Musku et al. |

* cited by examiner

CONGESTION DETECTION USING MACHINE LEARNING ON ARBITRARY END-TO-END PATHS

TECHNICAL FIELD

The present disclosure relates generally to computer networks, and, more particularly, to congestion detection using machine learning on arbitrary end-to-end paths.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits.

While BFD probing is capable of monitoring monitor network characteristics such as liveness, loss, latency, and jitter, the only way to measure the available bandwidth of a path is by performing so-called "speed tests," whereby a bulk data transfer is initiated across the path, to measure the achievable bitrate. This is akin to "filling the pipe," which can have the side effect of harming other applications sharing any segment along the path, as well as potentially being inaccurate due to quality of service (e.g., shaping) functions that may be applied to this type of traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device predicts a range of bitrates expected to be required by one or more applications associated with traffic conveyed via a particular path in a network. The device obtains telemetry data indicative of observed bitrates associated with the traffic conveyed via the particular path in the network. The device identifies, a presence of congestion along the particular path in the network, by comparing the observed bitrates to the range of bitrates expected to be required by the one or more applications. The device causes at least a portion of the traffic to be re-routed from the particular path to a second path in the network, when the device identifies the presence of congestion along the particular path.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
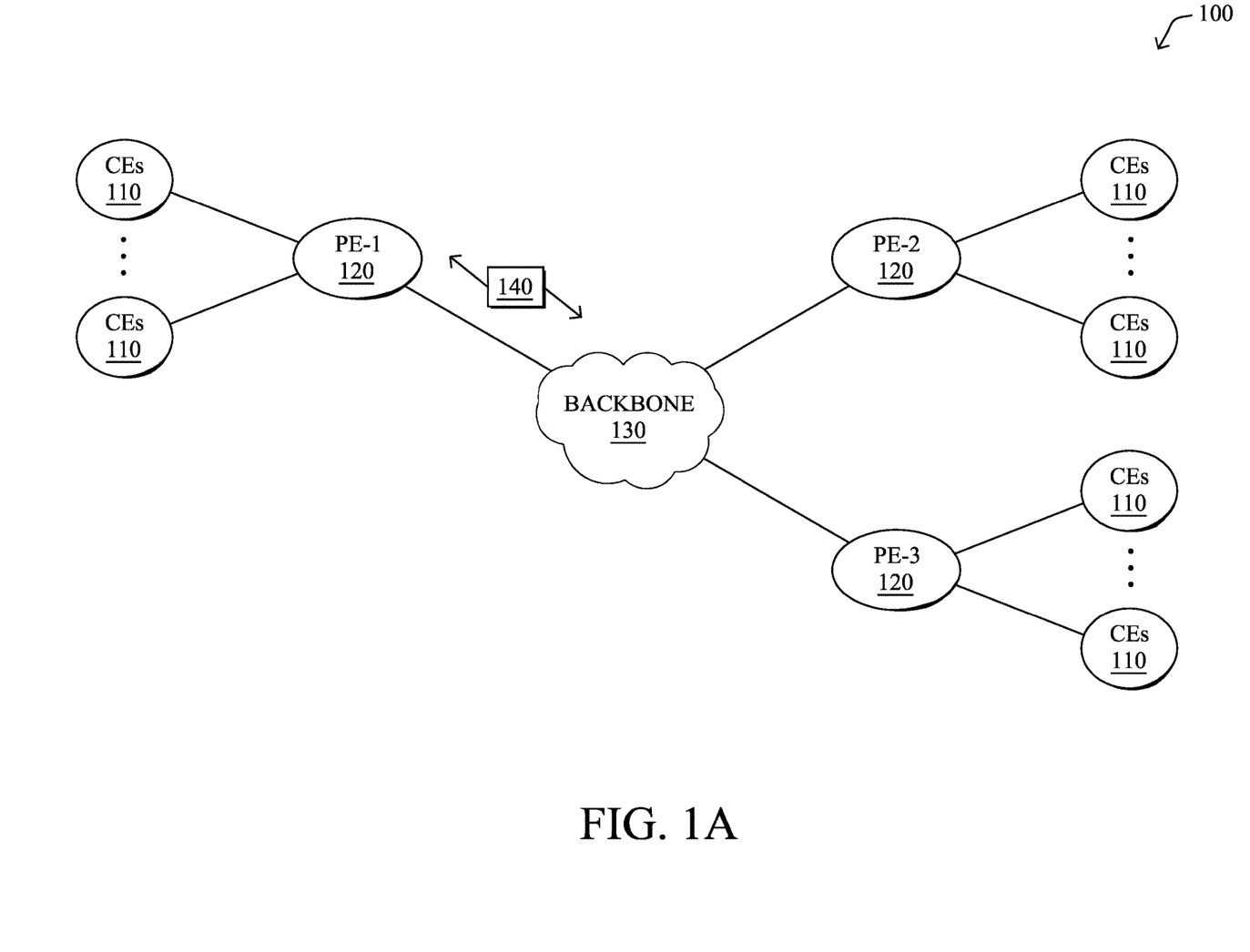
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
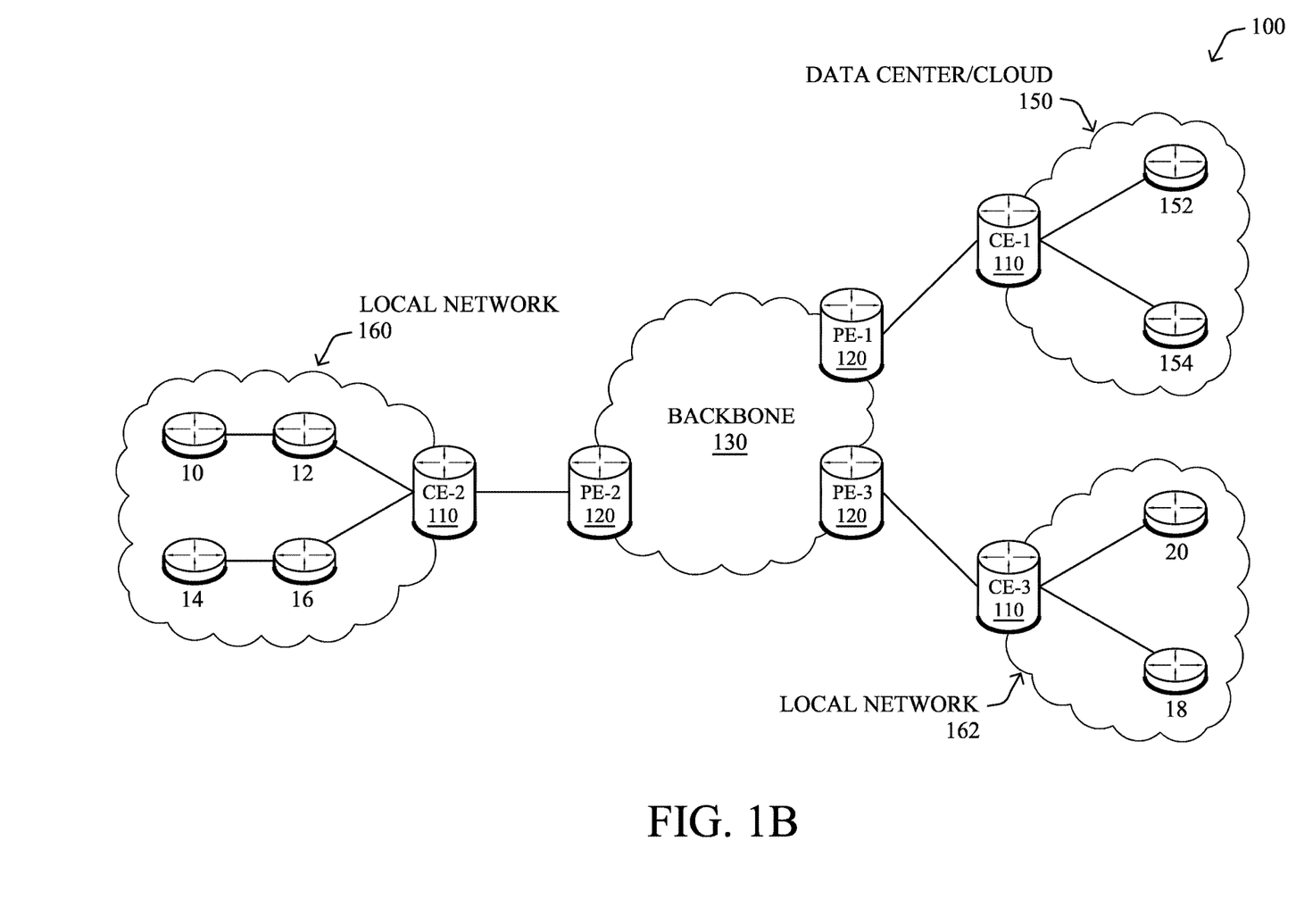

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
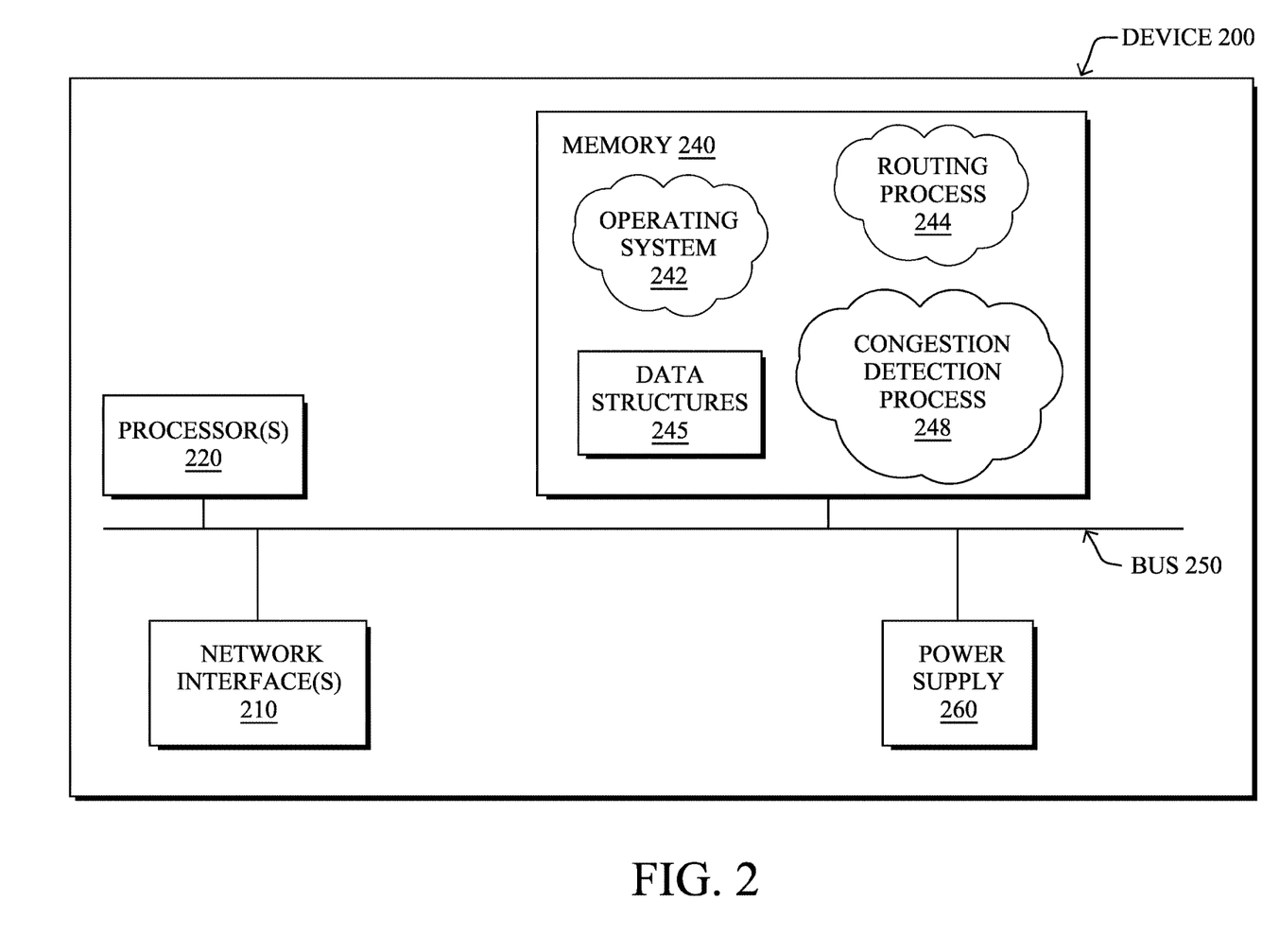
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a congestion detection process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or congestion detection process 248 may also include computer executable instructions that, when executed by processor(s) 220, cause device 200 to perform the techniques described herein. To do so, in some embodiments, routing process 244 and/or congestion detection process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or congestion detection process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or congestion detection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that congestion is present in the network. Conversely, the false negatives of the model may refer to the number of times the model incorrectly predicted that no congestion exists. True negatives and positives may refer to the number of times the model correctly predicted the presence or absence of congestion in the network, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
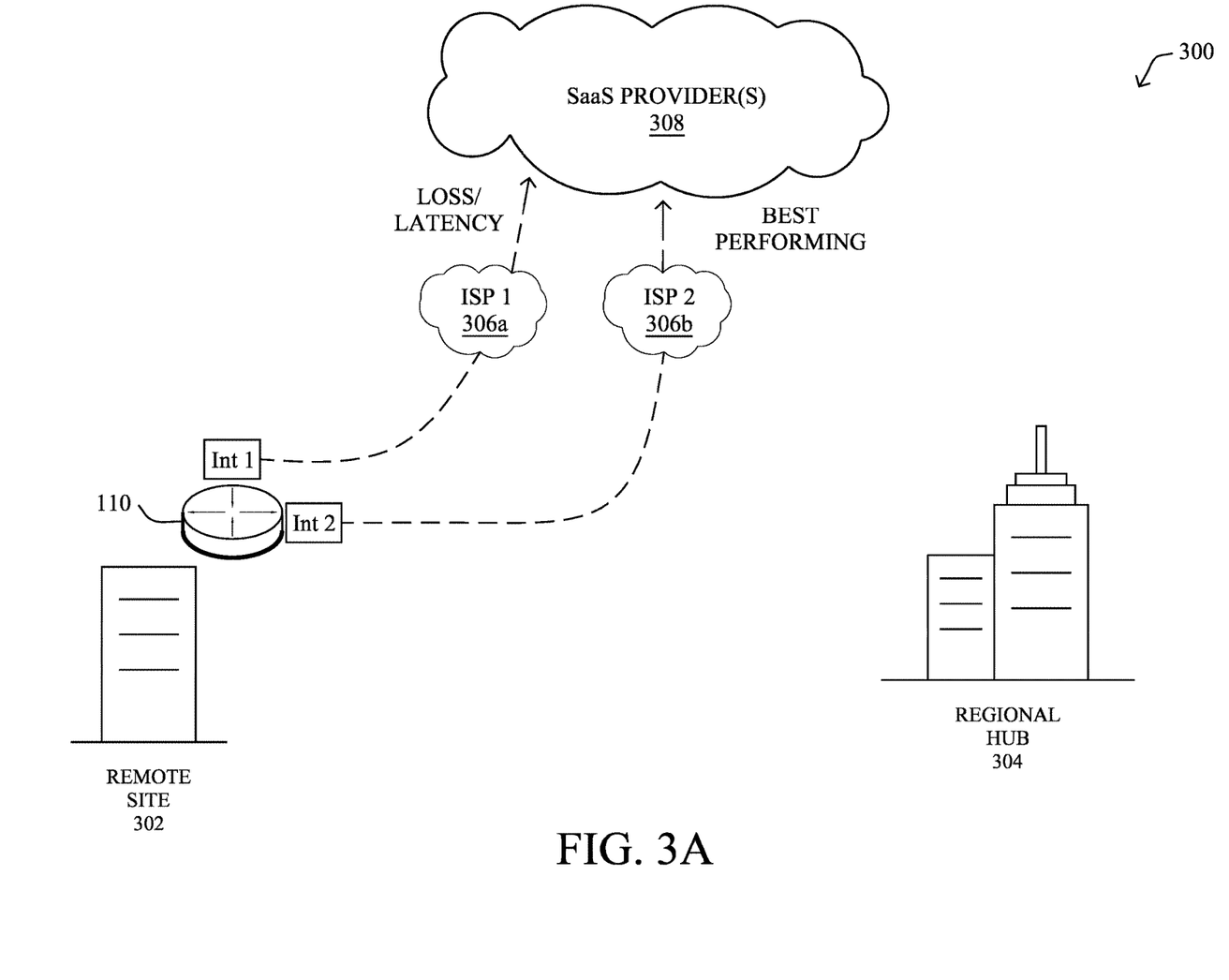
FIGS. 3A-3B illustrate example network deployments.
Figure 3B:
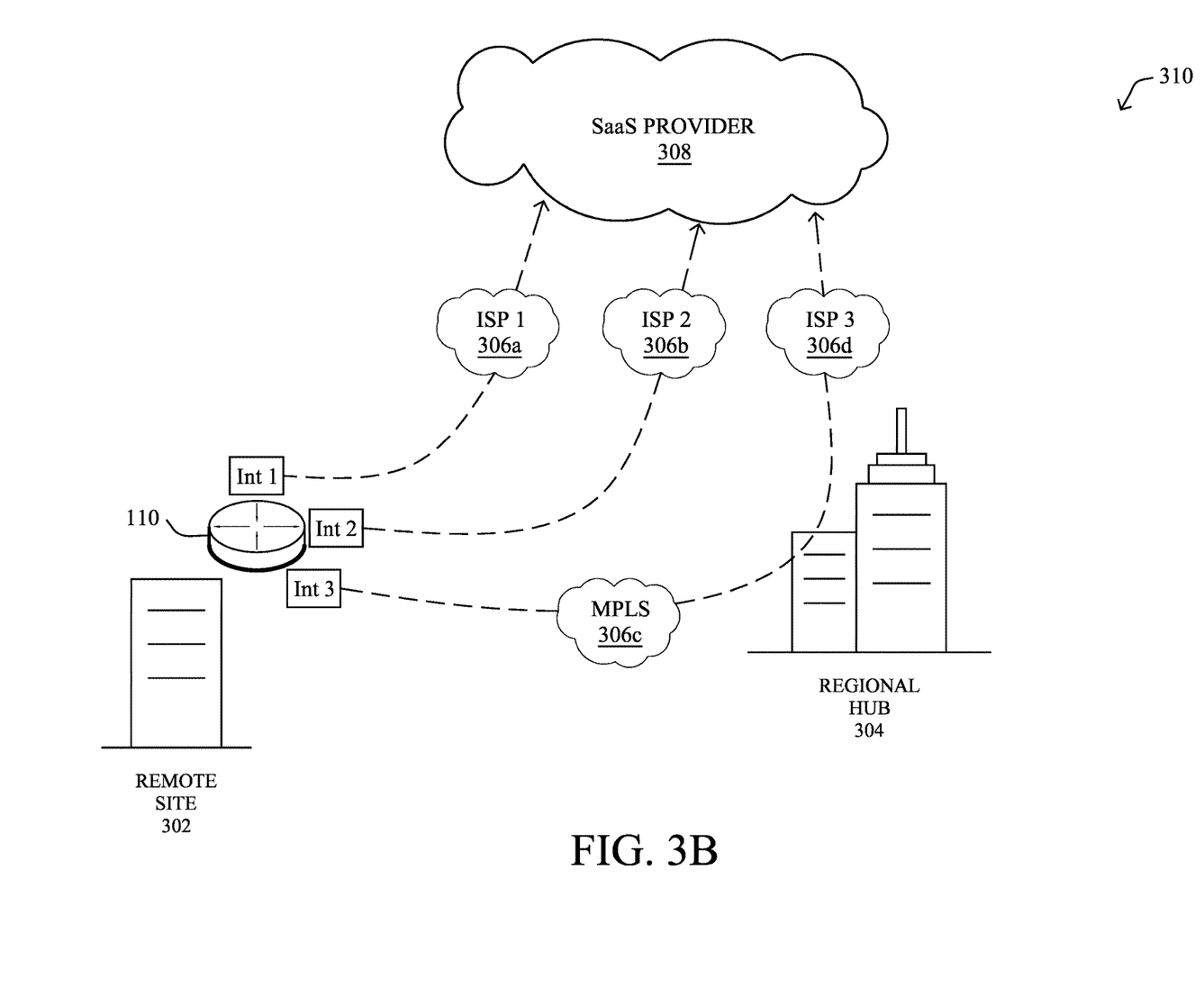

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
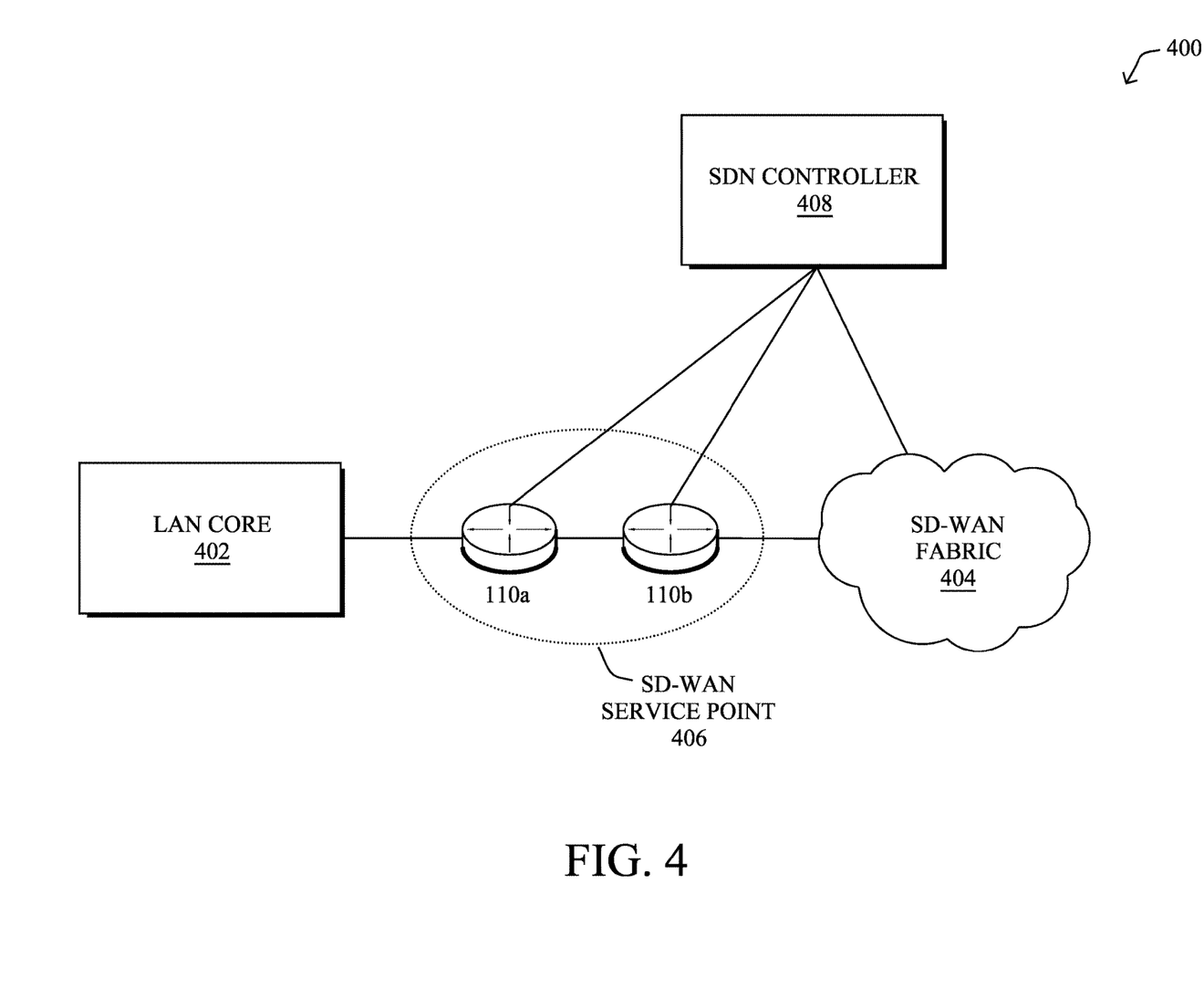
FIG. 4 illustrates an example software defined network (SDN) implementation.

FIG. 4 illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAB are checked using regular probing. Other solutions compute a metric reflecting a particular network characteristic (e.g., delay, throughput, etc.) and then selecting the supposed 'best path,' according to the metric.

As noted above, active probing techniques such as Bi-directional Forwarding Detection (BED) monitor network characteristics such as liveness, loss, latency, and jitter. During a BFD session, the edge router generates BFD probes that are echoed back by the remote edge router. The originating router time stamps each BFD packet, to determine the round-trip latency and jitter. However, such probes are sent every second and they are small enough that they are nigh useless in determining the amount of available bandwidth. The available bandwidth on a path, though, is a critical parameter of the QoE for many applications.

Typically, the only way to measure the available bandwidth along a path is by performing so-called "speed tests," which essentially establish a TCP/UDP connection to a remote server and perform a bulk data transfer, to measure the achievable bitrate on the path. This is akin to "filling the pipe," which has the potential side-effect of harming other applications sharing any segment along the path. In addition, this approach can be inaccurate because of QoS (e.g., shaping) that might have been applied to this type of traffic. Furthermore, these types of measurements should be realized frequently, since the available bandwidth on a given link is often highly dynamic. Indeed, the available bandwidth on a path can vary with the demand on the operator backbone, the number of simultaneous users connected to a given shared resource, the loads of the networking devices along the path, and other factors.

Congestion Detection Using Machine Learning on Arbitrary End-to-End Paths

The techniques introduced herein introduce a series of components that are capable of inferring the available bandwidth on an arbitrary end-to-end path from telemetry of traffic flowing along this path (e.g., NetFlow). In some aspects, the techniques herein propose using machine learning, to make certain predictions about the traffic conveyed via the path, such as the expected range of bitrates exhibited by the application traffic. By comparing these predictions to the observed bitrates of the traffic, the techniques herein can identify congestion events, without having to resort to active probing of the available bandwidth along the path.

Illustratively, the techniques described herein may be performed by hardware, software, and/or firmware, such as in accordance with congestion detection process 248, which may include computer executable instructions executed by the processor 220 (or independent processor of interfaces 210) to perform functions relating to the techniques described herein (e.g., in conjunction with routing process 244).

Specifically, according to various embodiments, a device predicts a range of bitrates expected to be required by one or more applications associated with traffic conveyed via a particular path in a network. The device obtains telemetry data indicative of observed bitrates associated with the traffic conveyed via the particular path in the network. The device identifies, a presence of congestion along the particular path in the network, by comparing the observed bitrates to the range of bitrates expected to be required by the one or more applications. The device causes at least a portion of the traffic to be re-routed from the particular path to a second path in the network, when the device identifies the presence of congestion along the particular path.

Figure 5:
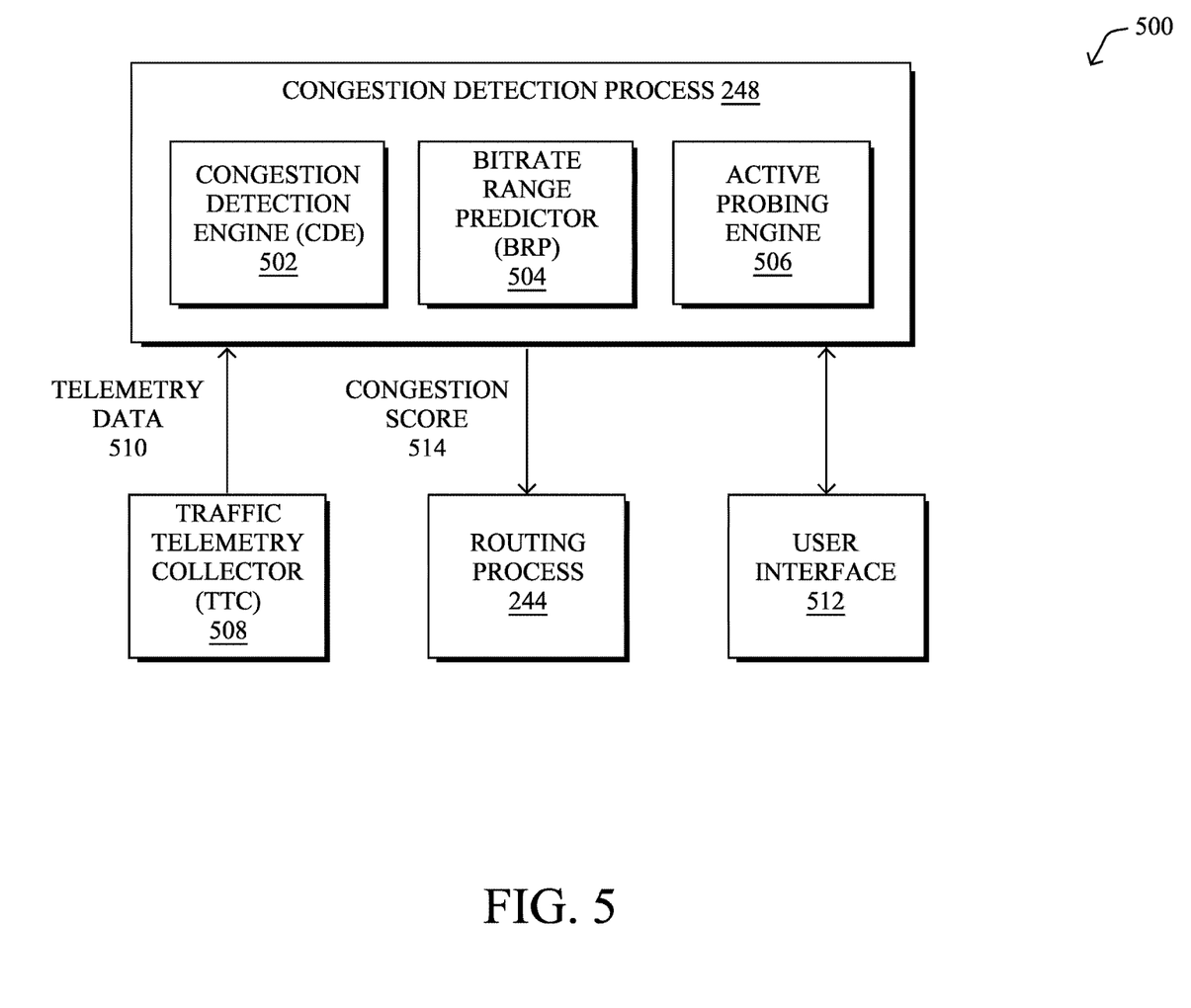
FIG. 5 illustrates an example architecture for detecting network congestion.

Operationally, FIG. 5 illustrates an example architecture 500 for detecting network congestion, according to various embodiments. At the core of architecture 500 is congestion detection process 248, which may be executed by a supervisory device of a network or another device in communication therewith. For instance, congestion detection process 248 may be executed by an SDN controller (e.g., SDN controller 408 in FIG. 4), a particular networking device in the network (e.g., a router, etc.), or another device in communication therewith. As shown, congestion detection process 248 may include any or all of the following components: a congestion detection engine (CDE) 502, a bitrate range predictor (BRP) 504, and/or an active probing engine 506. As would be appreciated, the functionalities of these components may be combined or omitted, as desired. In addition, these components may be implemented on a singular device or in a distributed manner, in which case the combination of executing devices can be viewed as their own singular device for purposes of executing congestion detection process 248.

In general, congestion detection process 248 may be executed in conjunction with other supervisory processes for a network. For instance, if congestion detection process 248 detects congestion along a particular path in the network, it may notify another process (e.g., routing process 244), to re-route at least a portion of the traffic on that path to another path in the network. In other words, congestion detection process 248 may be used to make routing and rerouting decisions in a network, such as an SD-WAN (SDN), a traditional network, or the like.

In various embodiments, architecture 500 may include at least one traffic telemetry collector (TTC) 508 that is responsible for providing telemetry data 510 to congestion detection process 248 for analysis. For instance, TTC 508 may comprise a NetFlow or IPFIX collector that reports telemetry data 510 regarding the various traffic flows in the network to congestion detection process 248 (e.g., the flows forwarded by the router associated with TTC 508). As would be appreciated, telemetry data 510 may include various statistics and other characteristic information regarding a traffic flow. For instance, telemetry data 510 may indicate the number of bytes of the traffic flow, the number of packets of the traffic flow, etc. In more advanced embodiments, custom fields could also be added to telemetry data 510, so as to improve the congestion detection by congestion detection process 248. For instance, in various embodiments, telemetry data 510 may also include information about the peak bitrate (e.g., using watermarking) in a given time interval, TCP flags, and/or other metrics such as, but not limited to, retransmission timeout (RTO), congestion window (CWND). TCP explicit congestion notification (ECN) echo flag (ECE), TCP congestion window reduced flag (CWR), and the like.

According to various embodiments, congestion detection process 248 may include congestion detection engine (CDE) 502 that uses machine learning to predict the available bandwidth on a given path, given telemetry data 510. For instance, given a SD-WAN tunnel between two routers R1 and R2, CDE 502 may first attempt to identify whether the link has reached a situation of congestion, that is, whether the traffic has "filled the pipe" and no remaining bandwidth is available on the path. In such situations, most of the TCP flows should indicate some congestion signs (e.g., flags such as ECN, ECE, CWR, etc., in telemetry data 510) and the average bitrates drop below the expected range for the said application or compared to the immediate past. In embodiments where TCP flags are not available from TTC 508, only the latter signs are available.

As would be appreciated, TCP is notoriously known to overreact to packet loss (e.g., due to drops in the core or the access layer, due to congestion). However, other feedback mechanisms, such as the Explicit Congestion Notification (ECN) bit, can also be used (two bits in the type of service field of the IP header). Accordingly, in various embodiments, CDE 502 may assess a variety of inputs (TCP flows, ECN bit, etc.) from a series of protocols available in telemetry data 510, so as to detect the presence of congestion. Note that while TCP is used primarily to describe the techniques herein, the techniques are not limited as such and can be applied to all protocols equipped with congestion detection mechanisms.

In another embodiment, CDE 502 may look for internal signals that are specific to a congestion event. For example, QoS may be configured with a traffic shaper and various queues used to prioritize traffic, where congestion avoidance mechanism such as Random Early Discard (RED) may be used. In such a case, CDE 502 may view the dropping of a packet due to the activation of the RED mechanism as an indication of a congestion event.

CDE 502 may also be equipped with local engines used to detect the flow rate for a given application, based on telemetry data 510. By monitoring the per-flow rate, CDE 502 may be able to detect when a plateau has been reached specific on a congestion event or simply that the maximum allowed bandwidth has been reached. Thus, CDE 502 may treat the detection of such as plateau as another signal of congestion.

According to various embodiments, congestion detection process 248 may also include titrate range predictor (BRP) 504, which is a machine learning model that estimates the expected Nitrate on a given path for a group of traffic flows. Note that BRP 504 does not intend to predict the available bandwidth (offer), but rather the expected bitrate: required by the application (demand) under a so-called "normal circumstance" where there is no congestion on the path.

Based on a mix of features such as the type of application, the number of clients and servers, the historical bitrates for these hosts, the time of day, BRP 504 may estimates a confidence interval (e.g., between 5- and 95-percentile), or simply the maximum expected bitrate, in various embodiments. To this end, BRP 504 may take the form of a regression model, such as a random forest, gradient boosted tree (GBT), deep neural network (DNN), or the like. For instance, given a video flow, BRP 504 may learn that the typical range of bitrates is between 125 kbps and 2 Mbps, in the absence of congestion.

BRP 504 may take as input features at the traffic flow level and/or for an entire set of applications. For instance, BRP 504 may predict an expected range for the bitrate of all voice and video flows on a link. In this case, the feature vector for BRP 504 may also include the number of such flows, the breakdown per specific application (e.g., Skype, WebEx, Zoom, etc.), as well as any further data to assess the expected throughput.

In some embodiments, CDE 502 may directly query the application programming interfaces (APIs) of the various applications/services, to obtain Layer-7 (L7) statistics about their flows. For instance, such statistics may indicate the number of participants or users, the use of screensharing, whether a call is voice only, the type of clients (e.g., mobile, telepresence), or the like. Including this information in the input features for BRP 504 may result in BRP 504 predicting more accurate and precise bitrate ranges for the traffic of the application. This type of data augmentation can be performed for any number of applications, such as Office 365, Salesforce, etc.

In yet another embodiment, BRP 504 may be limited to making predictions only for specific applications and/or destinations. Indeed, the estimated bandwidth will very much vary with the final destination, as any element on the path may act as a bottleneck, all the way to the backbone or datacenter of the cloud provider. Thus, CDE 502 may be required to estimate bandwidth available along a given tunnel destined to a specific head-end. In the case of SaaS applications, BRP 504 may apply to specific SaaS destination used locally by the router.

CDE 502 may then query BRP 504 for every flow or group of flows that it observes, and obtain an expected bitrate interval, denoted $[B_{min}, B_{max}]$. In practice, $B_{min}$ is the more interesting value, which is typically an estimate of a low percentile value (say, 1%) of the bitrate distribution. Now, if the observed bitrate ($B_{obs}$) falls below $B_{min}$, this may indicate that $B_{obs}$ is a good estimate of the currently available bandwidth, as it seems that the current traffic would have otherwise reached a value between $B_{min}$ and $B_{max}$. This is particularly true if $B_{obs}$ is the same for many TCP flows, since TCP congestion control should lead to approximately max-min fair allocation across flows. In this case, it can be expected that several flows whose predicted bitrate ranges are higher than the actual one will exhibit approximately the same saturation bitrate.

As noted, the assessment by CDE 502 can be made more reliable by adding evidence from TCP flags or by observing the distribution of bitrates across TCP flows, as indicated by telemetry data 510. CDE 502 constantly monitors the observed bitrate $B_{obs}$ while looking for any sign of congestion.

In various embodiments, CDE 502 and BRP 504 may also employ a feedback loop, as part of their operations. For instance, if $B_{obs}$ goes below $B_{min}$ without any sign of congestion or, conversely, CDE 502 observe signs of congestion without $B_{obs}$ falling below $B_{min}$, this may indicate that the predictions by BRP 504 are not accurate. In turn, BRP 504 may be re-trained on these samples with a higher importance, which can be adjusted using training sample weighting supported by many types of machine learning models.

According to various embodiments, the analysis by CDE 502 may lead to CDE 502 generating a congestion score 514 for a given path P and a given time interval T, which is denoted $S_P(T)$. In general, congestion score 514 denotes a likelihood that the observed bitrate $B_{obs}$ is indeed equal to the available bandwidth at the indicated point in time. For example, if $S_P(T)$ is close to 1 for path P, then $B_{obs}$ on P is very likely to equal the available bandwidth on P, at time T.

In various embodiments, CDE 502 may provide the congestion score to routing process 244, which may be executed by the same device as that of congestion detection process 248 or a different device, such as a router associated with path P, a network controller, or the like. This allows routing process 244 to perform path selection, based in part on congestion score 514. For instance, routing process 244 may trigger re-routing, on detection of congestion.

CDE 502 may also provide various information about its assessments and/or congestion score(s) 514, to a user interface 512 for review by a network operator. For instance, CDE 502 may combine its congestion score 514 with $B_{obs}$ when it is close to 1, to provide visibility into available bandwidth to various destinations for the network operator.

In some embodiments, BRP 504 may also compute uncertainty estimates associated with its predictions, to quantify how certain BRP 504 is of its predicted titrate, ranges. In turn, an active probing engine 506 may use these estimates to drive adaptive probing sessions along the path(s). For instance, when the predictions by BRP 504 for a given path P have a large degree of uncertainty (e.g., their uncertainty estimates exceed a defined threshold), active probing engine 506 may trigger active probing along path P, to improve the estimates. Such testing may seek to assess the bandwidth on the path by actively sending additional traffic along the path and measuring the results.

In another embodiment, active probing engine 506 may leverage active learning, to select the most beneficial 'regions' sets of features, such as applications, number of flows, etc.), whose active probing will maximize the information learned by congestion detection process 248. In some cases, a given budget of tests to be performed by active probing engine 506 may be set via user interface 512, such as for a specific period of time (e.g., per day), device (e.g., per router), or the like. In addition, a user may also specify, via user interface 512, a set of critical applications that should never be impacted by such probing tests.

Figure 6:
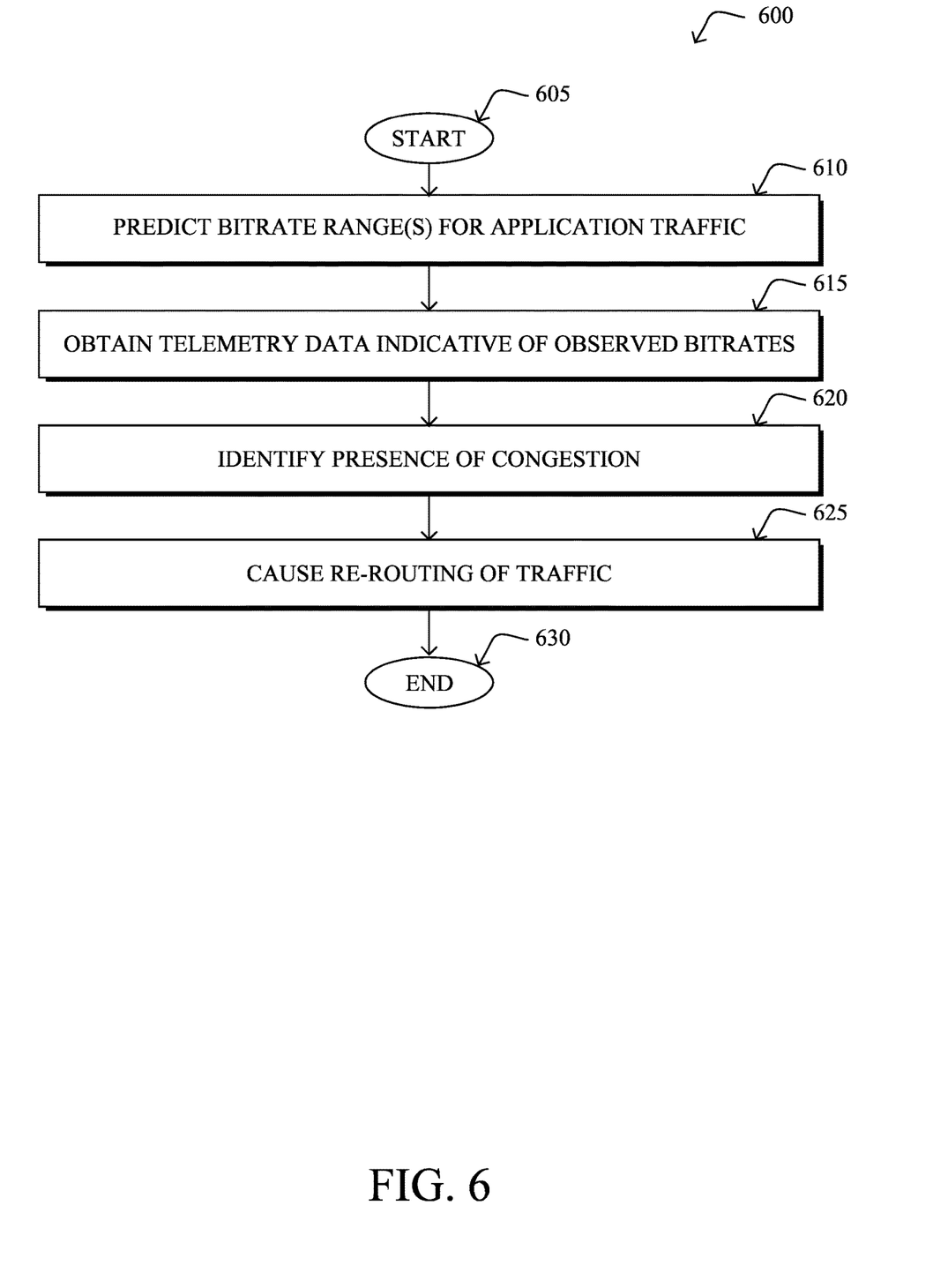
FIG. 6 illustrates an example simplified procedure for detecting congestion in a network.

FIG. 6 illustrates an example simplified procedure for detecting congestion in a network, in accordance with one or more embodiments described herein. For example, a non-generic, specifically configured device (e.g., device 200), such as a networking device (e.g., a router, an SDN controller for an SD-WAN, etc.), or a device in communication therewith, may perform procedure 600 by executing stored instructions (e.g., congestion detection process 248 and/or routing process 244). The procedure 600 may start at step 605, and continues to step 610, where, as described in greater detail above, the device may predict a range of bitrates expected to be required by one or more applications associated with traffic conveyed via a particular path in a network. For instance, the device may predict a minimum and maximum bitrate for traffic associated with a video conferencing application that is conveyed via the path. In various embodiments, the device may do so using a machine learning-based bitrate prediction model, such as a regression model. In various embodiments, Layer-7 information from the application can also be used as input to the model, such as information regarding the number of participants of the videoconference, the use of screensharing, etc.

At step 615, as detailed above, the device may obtain telemetry data indicative of observed bitrates associated with the traffic conveyed via the particular path in the network. For instance, such telemetry data may take the form of NetFlow records, IPFIX information, or the like, that is captured by one or more networking devices along the path. In some embodiments, in addition to indicating the observed bitrates, the telemetry data may also indicate various information from which congestion along the path can be inferred. For instance, the telemetry data may also indicate the presence or absence of TCP flags such as an ECN flag, ECE flag, CWR flag, etc. in the traffic. In a further example, the telemetry data may indicate the dropping of packets by a RED mechanism. In an additional case, the telemetry data may indicate the presence of plateauing behavior with respect to the observed bitrates, which can also be a sign of congestion along the path.

At step 620, the device may identify a presence of congestion along the particular path in the network, by comparing the observed bitrates to the range of bitrates expected to be required by the one or more applications, as described in greater detail above. For instance, if the observed bitrate is below the minimum bitrate predicted, this may indicate the presence of congestion along the path. In further embodiments, the device may base the identification further on the traffic using certain flags (e.g., TCP flags, etc.) and/or on the distribution of bitrates across different flows on the path.

At step 625, as detailed above, the device may cause at least a portion of the traffic to be re-routed from the particular path to a second path in the network, when the device identifies the presence of congestion along the particular path. For instance, the device may provide an indication of the congestion to a router along the path, a network controller, or other device responsible for making routing decisions. In other embodiments, such as when the device itself is able to make routing decisions, the device may initiate the rerouting, when it identifies the presence of congestion. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allows for the detection of congestion along a network path without having to resort to active, speed test-based probing of the path. Doing so can help to protect the existing traffic on the path, as active probing of the available bandwidth can often impact existing traffic.

While there have been shown and described illustrative embodiments that provide for congestion detection using machine learning on arbitrary end-to-end paths, it is to be understood that various other adaptations and modifications may be made within the spirit and scope of the embodiments herein. For example, while certain embodiments are described herein with respect to using certain models for purposes of predicting bitrates, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
predicting, by a device, a range of bitrates expected to be required by one or more applications associated with traffic conveyed via a particular path in a network;
obtaining, by the device, telemetry data indicative of observed bitrates associated with the traffic conveyed via the particular path in the network;
identifying, by the device, a presence of congestion along the particular path in the network, by comparing the observed bitrates to the range of bitrates expected to be required by the one or more applications; and
causing, by the device, at least a portion of the traffic to be re-routed from the particular path to a second path in the network, when the device identifies the presence of congestion along the particular path.

2. The method as in claim 1, wherein the network comprises a software-defined wide area network (SD-WAN) and wherein the particular path and the second path comprise network tunnels.

3. The method as in claim 1, wherein predicting the range of bitrates expected to be required by the one or more applications associated with traffic conveyed via the particular path in the network comprises:
obtaining, by the device, Layer-7 information from the one or more applications; and
using the Layer-7 information as input to a machine learning model trained to predict the range of bitrates.

4. The method as in claim 1, wherein the device identifies the presence of congestion along the particular path in the network, based in part on activation of a random early detection (RED) mechanism along the particular path.

5. The method as in claim 1, further comprising:
computing, by the device, a congestion score for the particular path that denotes a likelihood that the observed bitrates will equal available bandwidth on the particular path, wherein the device causes at least a portion of the traffic to be re-routed based in part on the congestion score.

6. The method as in claim 1, wherein the device identifies the presence of congestion along the particular path in the network, based in part on the telemetry data indicating the traffic using at least one of: a retransmission timeout (RTO), a congestion window (CWND), an explicit congestion notification (ECN) flag, an explicit congestion notification echo (ECE) flag, or a TCP congestion window reduced (CWR) flag.

7. The method as in claim 1, wherein predicting the range of bitrates comprises:
computing an estimated uncertainty associated with the range of bitrates predicted by the device.

8. The method as in claim 7, further comprising:
initiating, by the device, active probing of available bandwidth on the particular path, based in part on the estimated uncertainty associated with the range of bitrates predicted by the device.

9. The method as in claim 1, wherein the device predicts the range of bitrates using a machine learning model, the method further comprising:
initiating retraining of the machine learning model, based on the telemetry data indicating congestion along the particular path and the observed bitrates falling within the range of bitrates predicted by the device.

10. The method as in claim 1, wherein the device identifies the presence of congestion based on the observed bitrates being outside of the range of bitrates.

11. An apparatus, comprising:
one or more network interfaces;
a processor coupled to the one or more network interfaces and configured to execute one or more processes; and
a memory configured to store a process that is executable by the processor, the process when executed configured to:
predict a range of bitrates expected to be required by one or more applications associated with traffic conveyed via a particular path in a network;
obtain telemetry data indicative of observed bitrates associated with the traffic conveyed via the particular path in the network;
identify a presence of congestion along the particular path in the network, by comparing the observed bitrates to the range of bitrates expected to be required by the one or more applications; and
cause at least a portion of the traffic to be re-routed from the particular path to a second path in the network, when the apparatus identifies the presence of congestion along the particular path.

12. The apparatus as in claim 11, wherein the network comprises a software-defined wide area network (SD-WAN) and wherein the particular path and the second path comprise network tunnels.

13. The apparatus as in claim 11, wherein the apparatus predicts the range of bitrates expected to be required by the one or more applications associated with traffic conveyed via the particular path in the network by:
obtaining Layer-7 information from the one or more applications; and
using the Layer-7 information as input to a machine learning model trained to predict the range of bitrates.

14. The apparatus as in claim 11, wherein the apparatus identifies the presence of congestion along the particular path in the network, based in part on activation of a random early detection (RED) mechanism along the particular path.

15. The apparatus as in claim 11, wherein the process when executed is further configured to:
compute a congestion score for the particular path that denotes a likelihood that the observed bitrates will equal available bandwidth on the particular path, wherein the apparatus causes at least a portion of the traffic to be re-routed based in part on the congestion score.

16. The apparatus as in claim 11, wherein the apparatus identifies the presence of congestion along the particular path in the network, based in part on the telemetry data indicating the traffic using at least one of: a retransmission timeout (RTO), a congestion window (CWND), an explicit congestion notification (ECN) flag, an explicit congestion notification echo (ECE) flag, or a TCP congestion window reduced (CWR) flag.

17. The apparatus as in claim 11, wherein the apparatus predicts the range of bitrates by:
computing an estimated uncertainty associated with the range of bitrates predicted by the apparatus.

18. The apparatus as in claim 17, wherein the process when executed is further configured to:
initiate active probing of available bandwidth on the particular path, based in part on the estimated uncertainty associated with the range of bitrates predicted by the apparatus.

19. The apparatus as in claim 11, wherein the apparatus identifies the presence of congestion based on the observed bitrates being outside of the range of bitrates.

20. A tangible, non-transitory, computer-readable medium storing program instructions that cause a device to execute a process comprising:
predicting, by the device, a range of bitrates expected to be required by one or more applications associated with traffic conveyed via a particular path in a network;
obtaining, by the device, telemetry data indicative of observed bitrates associated with the traffic conveyed via the particular path in the network;
identifying, by the device, a presence of congestion along the particular path in the network, by comparing the observed bitrates to the range of bitrates expected to be required by the one or more applications; and
causing, by the device, at least a portion of the traffic to be re-routed from the particular path to a second path in the network, when the device identifies the presence of congestion along the particular path.

\* \* \* \* \*

UNITED STATES PATENT AND TRADEMARK OFFICE
CERTIFICATE OF CORRECTION

PATENT NO. : 11,470,005 B2  
APPLICATION NO. : 17/122755  
DATED : October 11, 2022  
INVENTOR(S) : Grégory Mermoud et al.

Page 1 of 1

It is certified that error appears in the above-identified patent and that said Letters Patent is hereby corrected as shown below:

In the Specification

Column 8, Line 64, please amend as shown:  
In turn, application SLAs are checked using regular prob- Column 9, Line 2, please amend as shown:  
directional Forwarding Detection (BFD) monitor network Column 10, Line 47, please amend as shown:  
dow (CWND), TCP explicit congestion notification (ECN)

Column 11, Line 28, please amend as shown:  
process 248 may also include bitrate range predictor (BRP)

Column 11, Line 30, please amend as shown:  
expected bitrate on a given path for a group of traffic flows.

Column 11, Line 32, please amend as shown:  
bandwidth (offer), but rather the expected bitrate required Column 12, Line 64, please amend as shown:  
how certain BRP 504 is of its predicted bitrate, ranges. In Column 13, Line 9, please amend as shown:  
'regions' (e.g., sets of features, such as applications, number of Signed and Sealed this  
Twenty-fourth Day of January, 2023

Katherine Kelly Vidal  
*Director of the United States Patent and Trademark Office*